(12) United States Patent
Li et al.

(10) Patent No.: US 9,097,332 B2
(45) Date of Patent: Aug. 4, 2015

(54) SPLIT SPROCKET HAVING SLIDE TRACKS

(71) Applicant: Laitram, L.L.C., Harahan, LA (US)

(72) Inventors: Xiaozhong Li, River Ridge, LA (US); Adam E. Bannerman, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 136 days.

(21) Appl. No.: 13/859,796

(22) Filed: Apr. 10, 2013

(65) Prior Publication Data

US 2014/0305241 A1    Oct. 16, 2014

(51) Int. Cl.
    *F16H 55/12*    (2006.01)

(52) U.S. Cl.
    CPC .............. *F16H 55/12* (2013.01); *Y10T 74/1993* (2015.01)

(58) Field of Classification Search
    CPC .......... F16H 55/46; F16H 55/30; F16H 55/12
    USPC ...................................... 474/95, 96
    See application file for complete search history.

(56) References Cited

U.S. PATENT DOCUMENTS

| | | | | |
|---|---|---|---|---|
| 302,218 A | * | 7/1884 | Zitzewitz | 474/95 |
| 405,352 A | * | 6/1889 | Gilbert | 474/95 |
| 416,457 A | * | 12/1889 | Gilbert | 474/96 |
| 416,592 A | * | 12/1889 | Gilbert | 474/95 |
| 429,116 A | * | 6/1890 | Cowles | 474/95 |
| 483,228 A | * | 9/1892 | Little | 474/95 |
| 536,696 A | * | 4/1895 | Hirsh | 74/448 |
| 569,663 A | * | 10/1896 | Perkins | 474/95 |
| 732,111 A | * | 6/1903 | Perkins | 384/618 |
| 774,965 A | * | 11/1904 | Davenport | 474/95 |
| 1,223,024 A | | 4/1917 | Barry | |
| 1,229,927 A | * | 6/1917 | Forshey | 474/98 |
| 1,359,822 A | * | 11/1920 | Misener | 474/96 |
| 1,391,719 A | | 9/1921 | Conyngham | |
| 2,074,822 A | * | 3/1937 | Wood | 310/269 |
| 2,451,690 A | * | 10/1948 | Oehler | 474/95 |
| 2,465,570 A | | 3/1949 | Bocchino | |
| 2,491,976 A | * | 12/1949 | Hauser | 403/366 |
| 2,950,933 A | * | 8/1960 | Mayne et al. | 403/279 |
| 3,097,541 A | | 7/1963 | Kindig | |
| 3,106,101 A | * | 10/1963 | Harriman | 474/96 |
| 4,043,214 A | * | 8/1977 | Westlake | 474/162 |
| 4,506,559 A | * | 3/1985 | Francke et al. | 74/439 |
| 4,865,478 A | * | 9/1989 | Chan et al. | 400/616.3 |
| 4,964,842 A | | 10/1990 | Howard | |
| 5,037,356 A | | 8/1991 | Gladczak et al. | |
| 5,074,406 A | | 12/1991 | Gundlach et al. | |
| 5,295,917 A | | 3/1994 | Hannum | |
| 5,316,522 A | | 5/1994 | Carbone et al. | |
| 5,322,478 A | | 6/1994 | Bos et al. | |
| 5,469,958 A | | 11/1995 | Gruettner et al. | |
| 5,511,893 A | * | 4/1996 | Kilgus et al. | 403/294 |

(Continued)

*Primary Examiner* — Michael Mansen
*Assistant Examiner* — Michael Riegelman
(74) *Attorney, Agent, or Firm* — James T. Cronvich

(57) ABSTRACT

A split sprocket for belts or chains. The split sprocket comprises two sections that slide together along parallel slide tracks that are perpendicular to two opposite walls of the sprocket's bore. The slide track includes male T-shaped, V-shaped, or jigsaw-puzzle-shaped beams on one of the sections that slide into mating female slots in the other section. The mated slide tracks prevent the sections from separating in all directions except the separation direction along the slide tracks. A fastener through one of the sections into the other prevents the assembled sprocket sections from sliding apart along the slide tracks.

40 Claims, 7 Drawing Sheets

(56) References Cited

U.S. PATENT DOCUMENTS

| | | |
|---|---|---|
| 5,810,686 A | 9/1998 | de Jong et al. |
| 5,848,947 A | 12/1998 | Fornasiere et al. |
| 5,888,158 A * | 3/1999 | Wilcher .......................... 474/95 |
| 6,074,316 A | 6/2000 | Murrietta, Sr. |
| 6,086,495 A | 7/2000 | Stebnicki et al. |
| 6,146,299 A | 11/2000 | Harvey |
| 6,543,609 B2 | 4/2003 | Layne et al. |
| 2007/0161443 A1 * | 7/2007 | Krisl .............................. 474/95 |
| 2007/0270260 A1 * | 11/2007 | Latham ........................ 474/152 |
| 2010/0160097 A1 * | 6/2010 | Van Der Ende ................. 474/95 |
| 2010/0273592 A1 * | 10/2010 | Curley et al. ................. 474/152 |

* cited by examiner

SPLIT SPROCKET HAVING SLIDE TRACKS

BACKGROUND

The invention relates generally to split sprockets to facilitate installation in endless belt systems.

Sprockets are used to drive endless power-transmission and conveyor belts and chains. Each sprocket is mounted on a shaft received by a bore extending axially through the sprocket. The shaft is supported at both ends by bearing blocks. A gearbox or a belt-driven pulley mounted to an end of the shaft makes the shaft a driveshaft. Installing a one-piece sprocket on a driveshaft requires that at least one bearing block be removed to slide the sprocket axially onto the shaft. Typically, the shaft also has to be lifted out of the conveyor side frame. Split sprockets that are split along seams through their bores can be installed on shafts without removing bearing blocks. A first piece of the split sprocket is positioned on the shaft. Then a complementary second piece is mated to the first piece. The two pieces are fastened to each other, usually by a pair of bolts or screws. One version of a split sprocket used with conveyor belts has two identical halves that fit together with mating puzzle-piece structure. Screws through the puzzle-piece structure at both seams tighten the pieces together. But the two screws do not provide much resistance to axial shifting of one sprocket half relative to the other.

SUMMARY

One version of a split sprocket embodying features of the invention comprises first and second sprocket sections joined to form at least three bore walls defining a central bore having an axis defining an axial direction and a periphery radially outward of and encircling the bore. Mating track elements on the first and second sprocket sections form first and second slide tracks separated from each other by the bore. The two sprocket sections are joined by sliding them together along the slide tracks in a slide direction perpendicular to the axial direction and parallel to one of the bore walls.

Another version of a split sprocket has an outer periphery and an interior portion forming first, second, third, and fourth bore walls defining a square bore axially through the sprocket. A slide track extends in a slide direction from the intersection of the adjacent first and second bore walls to a first stop surface inward of the periphery. A second slide track extends in the slide direction from the third bore wall opposite the first bore wall to a second stop surface inward of the periphery. The slide direction is perpendicular to the first and third bore walls. The sprocket is divisible into first and second sprocket sections along the slide tracks.

Yet another version of a split sprocket comprises first and second sprocket sections joined to form at least three bore walls defining a central bore having an axis defining an axial direction and a periphery radially outward of and encircling the bore. The first sprocket section forms a first complete one of the bore walls, and the second sprocket section forms a second complete one of the bore walls adjacent to the first complete one of the bore walls. First and second slide tracks are formed by mating track elements on the first and second sprocket sections. The first sprocket section is joined to the second sprocket section by sliding the first and second sprocket sections together along the first and second slide tracks in a slide direction parallel to the second one of the walls and perpendicular to the axial direction.

DETAILED DESCRIPTION

Figure 1:
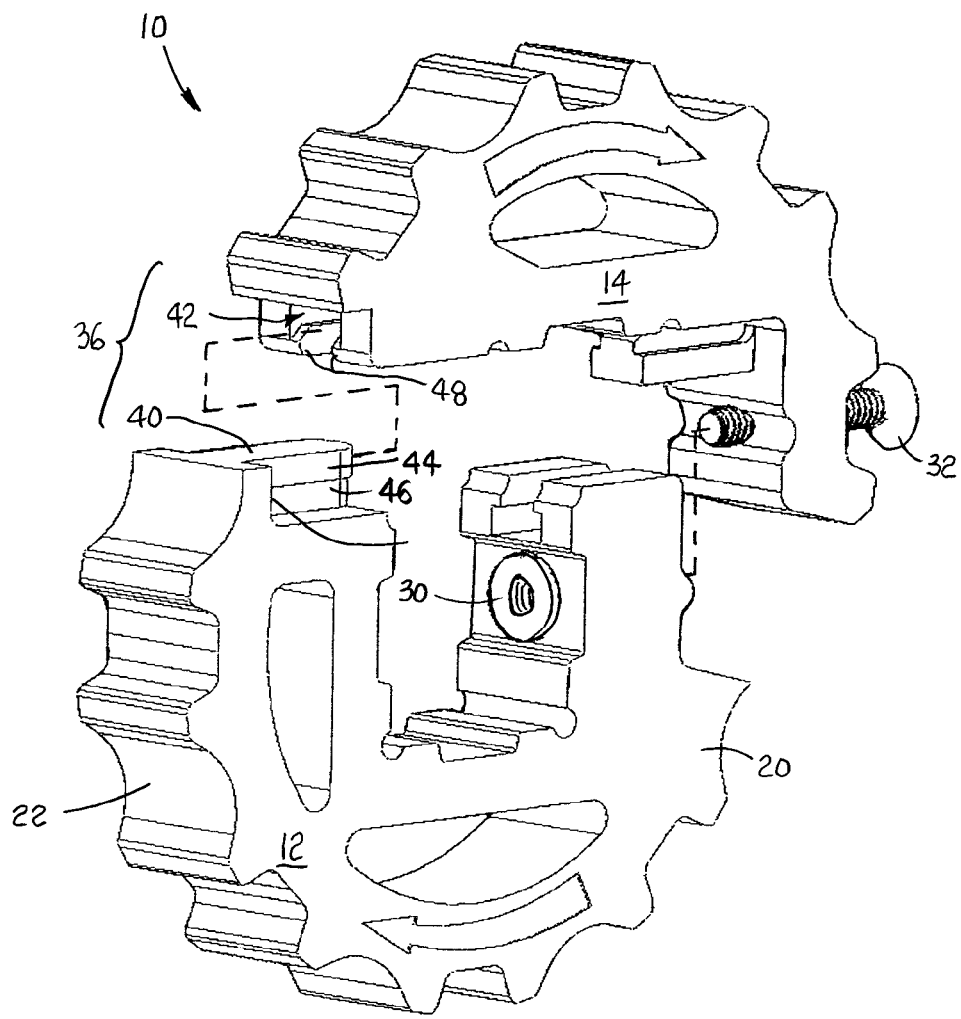
FIG. 1 is an axonometric view of one version of two sections of a split sprocket embodying features of the invention.
Figure 2:
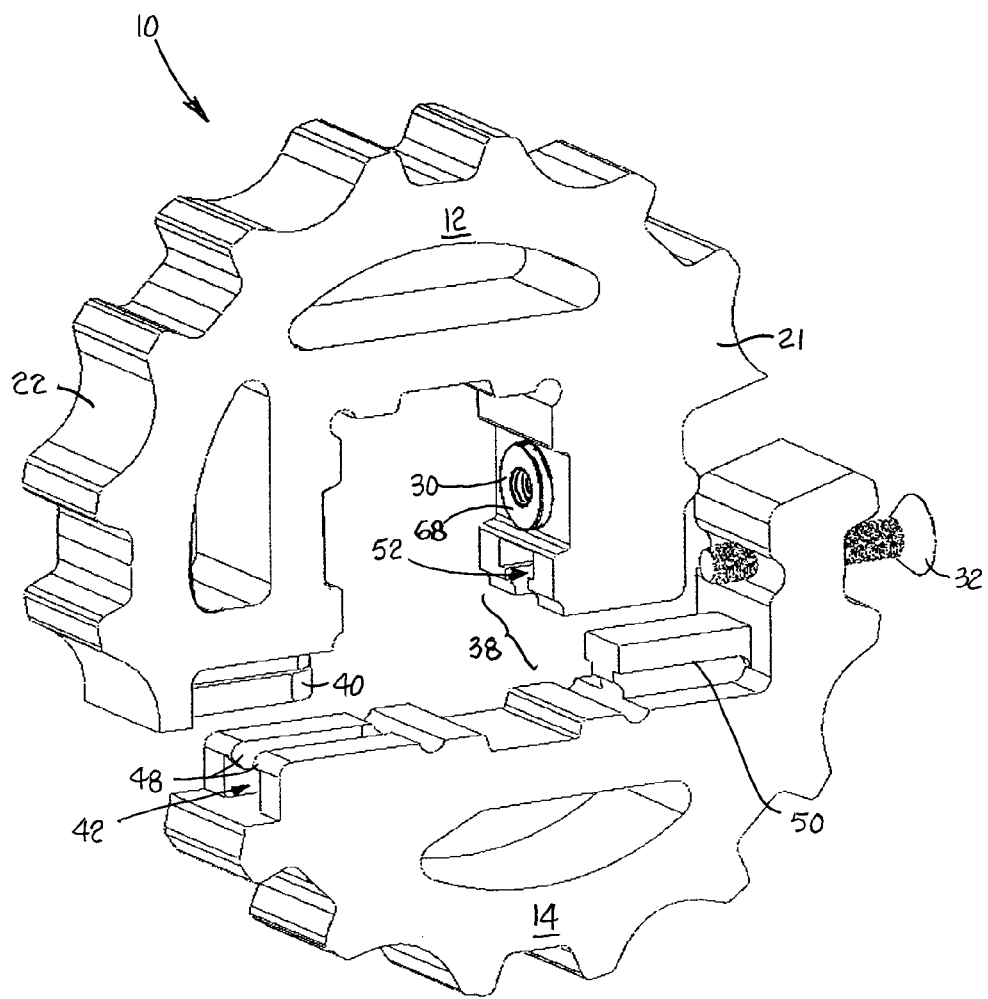
FIG. 2 is an axonometric view of the two sprocket sections of FIG. 1 viewed from the bottom rear side of the sprocket.

One version of a split sprocket embodying features of the invention is shown in FIGS. 1-5. The sprocket 10 is divisible into two sections: a first section 12 and a second section 14. In this example, the two sections are shaped differently with the first section 12 being the larger section. When the two sections are joined, as in FIG. 5, they define a central square bore 16 extending in an axial direction along an axis 18 from one lateral side 20 of the sprocket to the other lateral side 21 (FIG. 2). The two joined sprocket sections 12, 14, form an outer periphery 22 radially outward from the bore's axis 18 and encircling the bore 16. In this example, the periphery has ten drive teeth 24 for engaging drive structure on a conveyor belt or chain. The teeth are spaced equally around the circumference of the periphery at a constant pitch.

The square bore 16 has four bore walls 26A-D. In the exemplary split sprocket 10, the larger section 12 forms three of the walls 26A-C, and the smaller section forms one of the walls 26D. Recesses 28 formed in the middle of each wall and recesses 29 at the corners of the bore 16 (at the intersections of adjacent walls) provide stress relief at the corners, remove unnecessary material from the bore walls, provide a flow path between the sprocket and the shaft for cleaning water, and provide room for the base of a threaded insert 30 and the end of a retention bolt 32.

Figure 5:
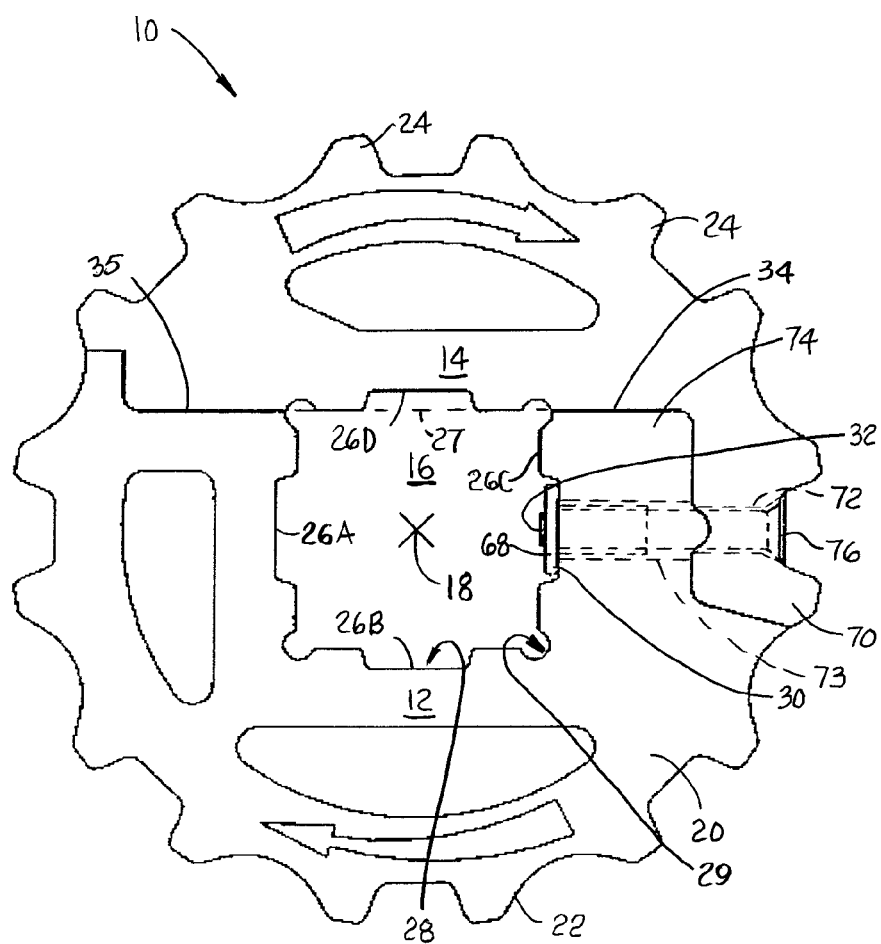
FIG. 5 is a side elevation view of the split sprocket of FIG. 1.

When joined, the two sprocket sections 12, 14 are separated along two seams 34, 35 that terminate at outer ends on the periphery 22 and at their inner ends at the bore 16. Two parallel slide tracks 36, 38 (FIG. 3) form complete or partial portions of the seams. As best shown in FIG. 1, the larger sprocket section 12 has a beam 40 extending from just inside the periphery 22 to a corner of the bore 16. A slot 42 formed on the smaller sprocket section 14 receives the beam 40. The beam and the slot constitute mating male and female track elements of one of the slide tracks 36. In this example the beam 40 is a T beam having a flange 44 and a web 46, and the slot 42 is an undercut T slot with confronting lips 48. The other slide track 38, better shown in FIG. 2, includes similar mating track elements: a T beam 50 on the smaller sprocket section 14 and a T slot 52 on the larger section 12. Both slide tracks 36, 38 are arranged with their slide direction perpendicular to the axial direction and to two of the bore walls 26A, 26C and parallel to the other two bore walls 26B, 26D. The slide tracks are shown aligned with each other and with the bore wall 26D formed by the smaller sprocket section 14. Neither of the slide tracks shown lies along a radius of the sprocket; i.e., as shown in FIG. 5, a linear extension 27 of either of the slide tracks does not intersect the axis 18 of the bore.

Figure 3:
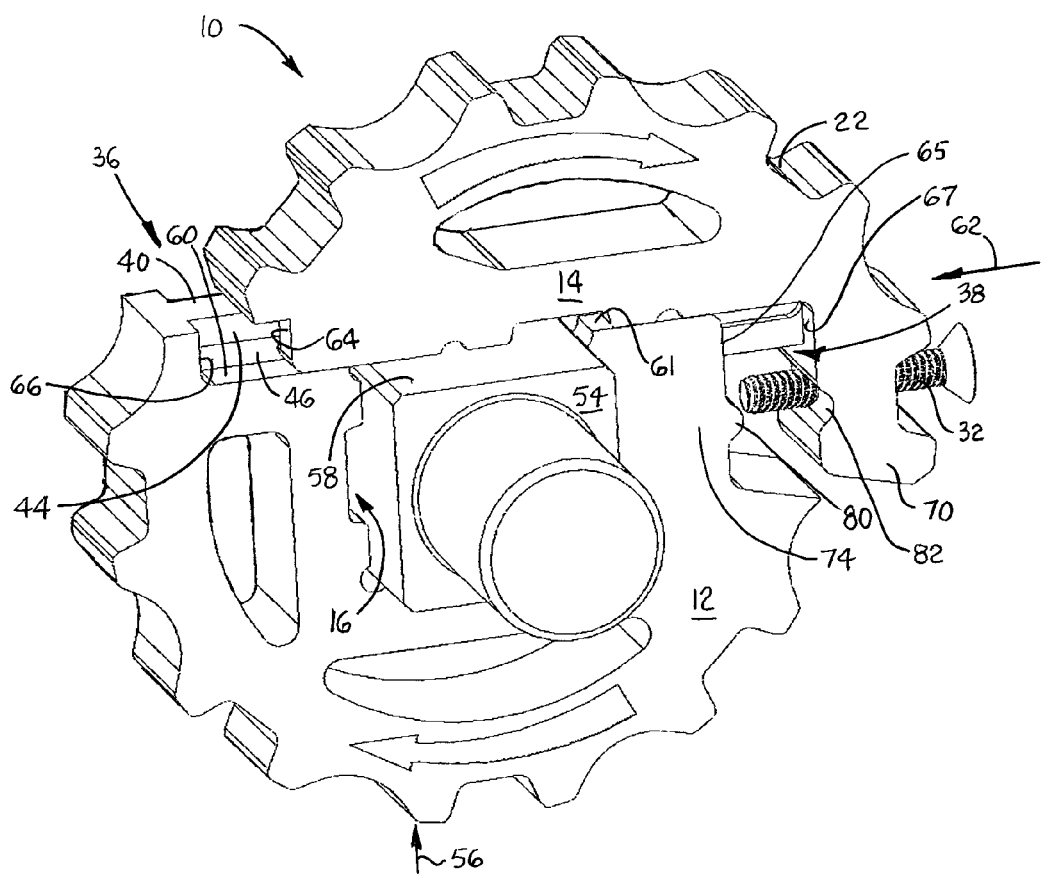
FIG. 3 is an axonometric view of the split sprocket of FIG. 1 showing the two sections being slid together over a shaft.
Figure 4:
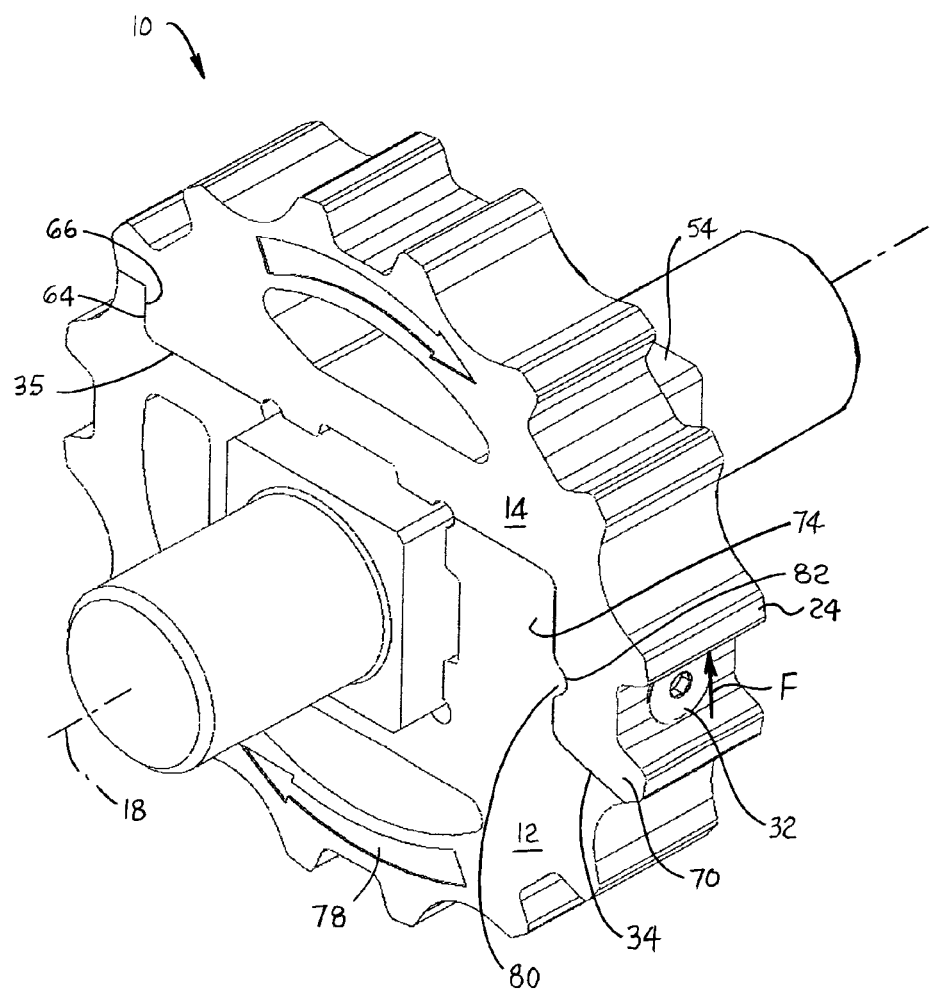
FIG. 4 is an axonometric view of the assembled split sprocket of FIG. 3 on the shaft.

The two sprocket sections 12, 14 are joined on a square shaft 54 as illustrated in FIG. 3. First, the larger sprocket section 12 is pushed radially onto the shaft 54 in the direction of arrow 56. The top face 58 of the shaft 54 lies slightly below the level of the lower sliding surfaces 60 of the slide track 36 on opposite sides of the web 46 of the T beam 40 on the larger sprocket section 12. In this example the lower sliding surfaces 61 of the slide track 38 on the opposite side of the bore 16 are parallel to and collinear with the opposite slide surfaces 60. But the slide track 38 could be formed at a lower level—even below the level of the shaft's top face 58, and the slide track 36 could be formed at a higher level above the level of the shaft's top face. With the larger sprocket section 12 held in place on the upper shaft 54, the smaller sprocket section 14 is pushed along the lower sliding surfaces 60, 61 in the direction of arrow 62 (the slide direction) until a leading face 64 of the smaller sprocket section 14 hits a stop surface 66 at a blind end of the slide track 36, which registers the two sprocket sections 12, 14 together and prevents oversliding, as shown in FIG. 4. A second stop surface 67 on the smaller sprocket section 14 at the outer end of the slide track 38 contacts a face 65 on the larger sprocket section 12 at the same time. The two sprocket sections are then locked together in registration with the bolt 32 or another equivalent threaded fastener or elongated fastener, such as a screw or other headed rod.

The smaller sprocket section 14 has a tongue extension 70 of the sprocket periphery 22 with a hole 72, such as a countersunk hole (FIG. 5), extending from the periphery through the thickness of the tongue extension. The hole 72 aligns with a second hole 73 in a recessed portion 74 of the larger sprocket section 12. The recessed portion 74 is shaped to nest the tongue extension 70 of the other sprocket section. The hole 73 in the larger section can be threaded to engage the bolt 32 or can receive the threaded insert 30 that engages the bolt. The insert 30 shown has a base 68 that rests in the recess on the bore wall 26C to avoid the shaft. The bolt 32 has a flat head 76 recessed inward of the periphery into the countersunk hole 72. The threaded engagement of the headed bolt and the threaded insert holds the two sprocket sections together in compression.

The structure of the slide track 36, 38 restricts relative axial motion of the two sprocket sections 12, 14 and relative motion of the two sprocket sections in a direction perpendicular to the axial direction 18 and to the slide direction 62. The webs 46 of the T beams 40, 50 prevent the sprocket sections from separating along the axis 18 of the sprocket. The flanges 44 of the T beams 40, 50 and the lips 48 of the T slots 42 cooperate to prevent the sprocket sections from separating in a direction 56 (FIG. 3) perpendicular to the axial direction 18 and to the slide direction 62 of the tracks 36, 38. Because the slide tracks restrict separation in those directions, only one fastener, e.g., the bolt 32, is needed. (If the engagement of the beams with the slots is tight enough, no fastener may be needed. Alternatively, detent structure on one or both slide tracks could be used to prevent the mated sprocket sections from separating during use.) The bolt extends from one sprocket piece 14 into the other 12 to hold them together and prevent the pieces from sliding apart. The sprocket 10 is removed from the shaft 54 by reversing the process: first, removing the screw and then sliding the smaller sprocket section opposite the direction of arrow 62 (FIG. 3) along the slide tracks 36, 38 until the sections disengage and can be removed from the shaft.

When the shaft 54 drives the sprocket 10 in the direction of arrow 78, as in FIG. 4, a reaction force F against the face of the drive tooth 24 by the belt tends to separate the two sprocket sections along the seam 35. To reduce the stress on the bolt 32, an axial rib 80 formed on the recessed portion 74 of the larger sprocket section 12 engages a corresponding groove 82 to absorb the force tending to separate the sections. In this example, the bolt 32 extends through the groove and the rib.

Figure 6:
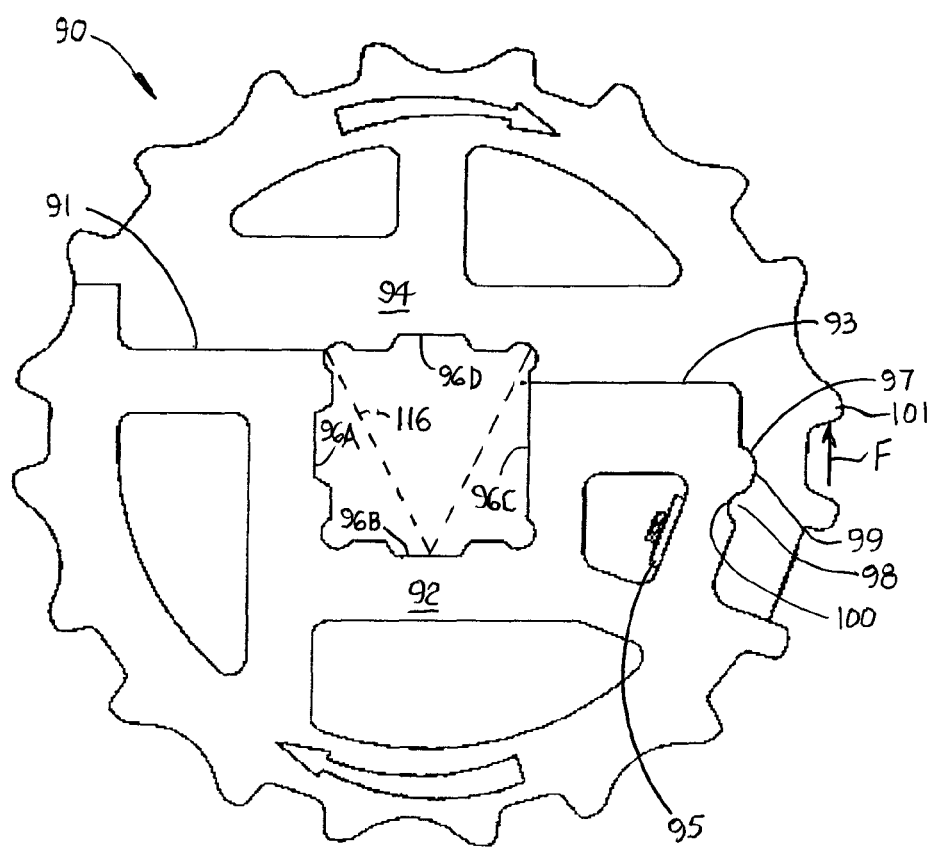
FIG. 6 is a side elevation view of another version of a split sprocket embodying features of the invention.

Another version of a split square-bore sprocket is shown in FIG. 6. The sprocket 90 is made of two separate sections: a larger section 92 and a smaller section 94 joined along offset, parallel slide tracks 91, 93 and locked by a fastener system 95. But in this version, one of the bore walls 96C is provided in part by the larger sprocket section 92 and in part by the smaller section 94. For split square-bore sprockets that join as shown on a square shaft by sliding along slide tracks over the shaft, one of the sections forms at least two complete bore walls, and the other forms at least one complete bore wall that is parallel to the slide direction. In the sprocket 10 of FIG. 5, the smaller section 14 forms one bore wall 26D, and the larger section 12 forms three bore walls 26A-C. In the sprocket 90 of FIG. 6, the smaller section 94 forms just over one complete bore wall (the wall 96D and a small portion of the adjacent wall 96C), and the larger section 92 forms just less than three bore walls (the adjacent walls 96A, 96B and most of the wall 96C).

The sprocket 90 also has an enlarged rib 97 extending axially along the larger sprocket segment 92 and a smaller axial rib 98 on the smaller section 94. Mating axial grooves 99, 100 receive the ribs. The rib-groove structure takes most of the separation force caused by the circumferential belt load F on the drive teeth 101 on the periphery of the sprocket 90. Without the rib-groove structure, the fastening components 95 would be subjected to the separation force.

Figure 7:
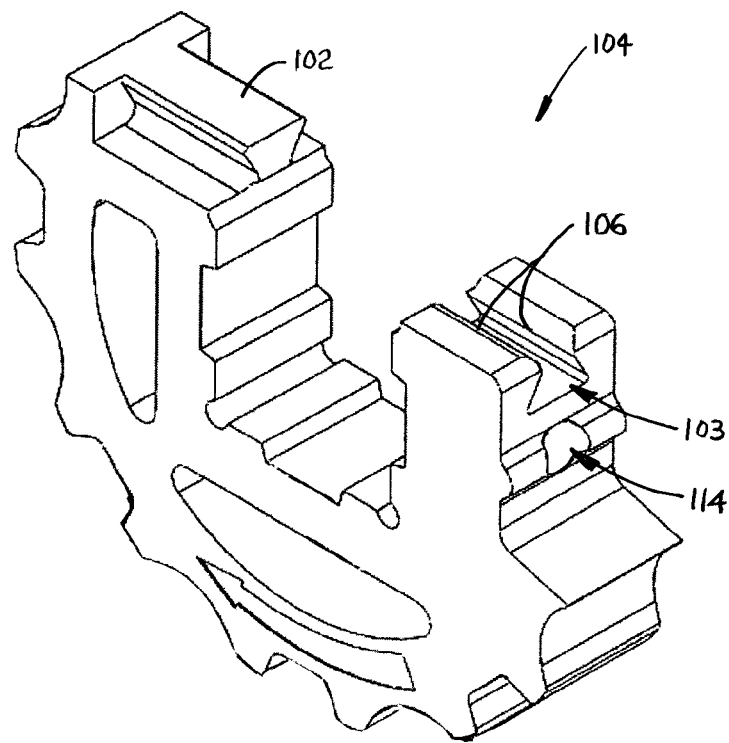
FIG. 7 is an isometric view of a larger sprocket section as in FIG. 1 with V-shaped beams and slots.
Figure 8:
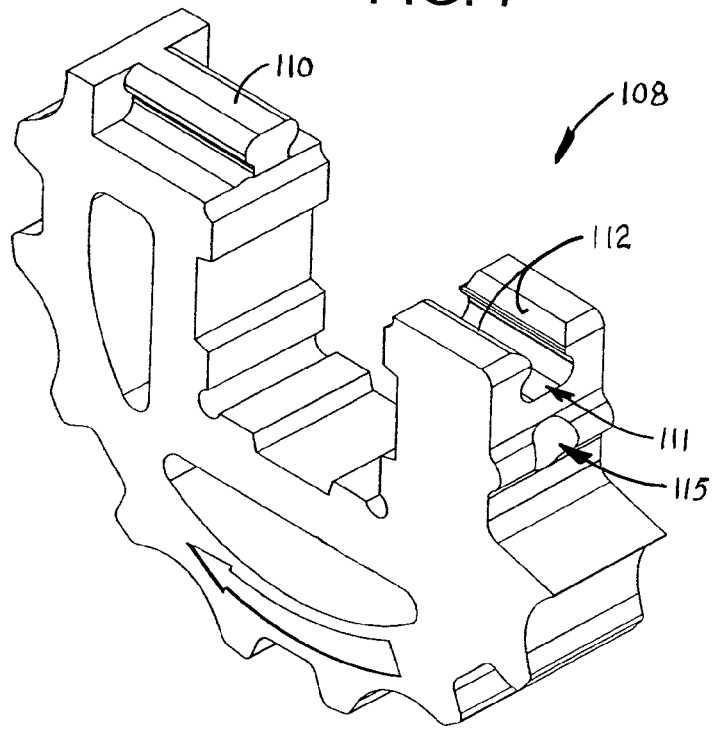
FIG. 8 is an isometric view of a larger sprocket section as in FIG. 1 with jigsaw-puzzle-shaped beams and slots.

In FIG. 7, a slide-track beam 102 in a larger sprocket section 104 has a V-shaped cross-section that mates with a V-shaped slot on a smaller sprocket section (not shown). The V-shaped slot on the smaller sprocket section has a cross-section like that of the V-shaped slot 103 on the larger sprocket section, which mates with a V-shaped beam on the smaller sprocket section. Confronting lips 106 on the slots hold the mating beams in place. Similarly, a larger sprocket section 108 in FIG. 8 has a jigsaw-puzzle-shaped beam 110 and slot 111 with confronting lips 112 to prevent the sprocket sections from separating except in the separation direction along the slide tracks. Like the sprocket sections of FIGS. 1-6, the sprocket sections 104, 108 shown in FIGS. 7 and 8 have holes 114, 115 for receiving fasteners. But with a tight enough fit or with detents formed on the slide tracks, a fastener may not be needed to hold the sections together.

Although the invention has been described in reference to two versions of split sprockets, other versions are possible. For example, the periphery does not have to be toothed; it could be smooth like a roller, or grooved like a pulley. So, the term sprocket as used in the claims is meant to encompass split wheels with or without teeth on their peripheries. As another example, each sprocket section could have track elements of the same sex: both track elements on one of the sprocket sections could be slots and both on the other sprocket section could be beams. As yet another example, the split sprockets could be made with triangular bores 116, as in FIG. 6. In this example, the two slide tracks are also separated by the bore, with the slide track 93 extended in length. Although the triangular bore in FIG. 6 is depicted as isosceles, an equilateral bore would be better.

What is claimed is:
1. A split sprocket comprising:
   a first sprocket section and a second sprocket section joined to form:
      at least three bore walls defining a central bore having an axis defining an axial direction; and
      a periphery radially outward of and encircling the bore;

first and second slide tracks formed by mating track elements disposed on the first and second sprocket sections and extending to the bore, wherein the first slide track is separated from the second slide track by the bore and wherein the first sprocket section is joined to the second sprocket section by sliding the first and second sprocket sections together along the first and second slide tracks in a slide direction perpendicular to the axial direction and parallel to one of the bore walls.

2. A split sprocket as in claim 1 wherein the first and second slide tracks are aligned with each other.

3. A split sprocket as in claim 1 wherein the first and second slide tracks are offset from each other.

4. A split sprocket as in claim 1 wherein at least one of the slide tracks opens onto the intersection of two sides of the bore.

5. A split sprocket as in claim 1 wherein a linear extension of the first slide track does not intersect the axis of the bore.

6. A split sprocket as in claim 1 wherein at least one of the slide tracks is aligned with one of the bore walls.

7. A split sprocket as in claim 1 wherein the central bore is a triangular bore.

8. A split sprocket as in claim 1 wherein the mating track elements of the first slide track include a first beam on the first sprocket section and a first slot on the second sprocket section receiving the first beam and the mating elements of the second slide track include a second beam on one of the first and second sprocket sections and a second slot on the other of the first and second sprocket sections receiving the second beam.

9. A split sprocket as in claim 8 wherein the first and second slots are T-shaped and the first and second beams are T beams.

10. A split sprocket as in claim 8 wherein the first and second slots are V-shaped and the first and second beams are V-shaped beams.

11. A split sprocket as in claim 8 wherein the first and second slots are jigsaw-puzzle-shaped and the first and second beams are jigsaw-puzzle-shaped beams.

12. A split sprocket as in claim 8 wherein the first and second slots are undercut with confronting lips and the first and second beams include flanges retained in the slots by the lips.

13. A split sprocket as in claim 1 wherein the mating track elements of the first and second slide tracks when mated prevent separation of the first sprocket section from the second sprocket section in the axial direction and in a second direction perpendicular to the slide direction and to the axial direction.

14. A split sprocket as in claim 1 wherein at least one of the first and second slide tracks includes a blind end having a stop surface preventing the first and second sprockets sections from being slid past registration.

15. A split sprocket as in claim 1 wherein the first and second sprocket sections are joined to form the central bore as a square having four bore walls.

16. A split sprocket as in claim 15 wherein the slide direction is perpendicular to two of the bore walls.

17. A split sprocket as in claim 15 wherein the first sprocket section forms at least two complete adjacent bore walls and wherein the second sprocket section forms at least one complete bore wall.

18. A split sprocket as in claim 17 wherein the first sprocket section forms three complete bore walls and the second sprocket section forms one complete bore wall and wherein the slide tracks are aligned with the one complete bore wall formed by the second sprocket section.

19. A split sprocket as in claim 1 further comprising a threaded fastener extending from the periphery and through the second sprocket section into the first sprocket section to secure the first and second sprocket sections from sliding apart along the slide tracks.

20. A split sprocket as in claim 1 wherein the first sprocket section has a recessed portion recessed inward of the periphery proximate the second slide track and wherein the second sprocket section has a tongue extension of the periphery that is received in the recessed portion.

21. A split sprocket as in claim 20 further comprising:
a hole extending through the tongue extension of the second sprocket section and into the recessed portion of the first sprocket section;
a threaded insert in the recessed portion of the first sprocket section; and
a fastener having a head recessed into the tongue extension and extending though the hole into threaded engagement with the threaded insert.

22. A split sprocket as in claim 20 further comprising:
a fastener extending from the tongue extension and into the recessed portion to secure the first and second sections together;
a rib on one of the tongue extension and the recessed portion proximate the fastener; and
a groove on the other of the tongue extension and the recessed portion receiving the rib when the first and second sections are secured to help prevent separation of the tongue extension from the recessed portion due to circumferential loads on the periphery of the sprocket.

23. A split sprocket comprising:
an outer periphery;
an interior portion forming first, second, third, and fourth bore walls defining a square bore axially through the sprocket;
a first slide track extending in a slide direction from the intersection of the adjacent first and second bore walls to a first stop surface inward of the periphery and a second slide track extending in the slide direction from the third bore wall opposite the first bore wall to a second stop surface inward of the periphery, wherein the slide direction is perpendicular to the first and third bore walls;
wherein the sprocket is divisible into first and second sprocket sections along the slide tracks.

24. A split sprocket as in claim 23 further comprising a fastener extending from the second sprocket section into the first sprocket section to secure the first and second sprocket sections from sliding apart along the slide tracks.

25. A split sprocket as in claim 23 wherein the first slide track includes a first beam on the first sprocket section and a first slot on the second sprocket section receiving the first beam and the second slide track includes a second beam on one of the first and second sprocket sections and a second slot on the other of the first and second sprocket sections receiving the second beam.

26. A split sprocket as in claim 25 wherein the first and second slots are T-shaped and the first and second beams are T beams.

27. A split sprocket as in claim 25 wherein the first and second slots are V-shaped and the first and second beams are V-shaped beams.

28. A split sprocket as in claim 25 wherein the first and second slots are jigsaw-puzzle-shaped and the first and second beams are jigsaw-puzzle-shaped beams.

29. A split sprocket as in claim 25 wherein the first and second slots are undercut with confronting lips and the first and second beams include flanges retained in the slots by the lips.

30. A split sprocket as in claim 23 wherein the first sprocket section has a recessed portion recessed inward of the periphery proximate the second slide track and wherein the second sprocket section has a tongue extension of the periphery that is received in the recessed portion.

31. A split sprocket as in claim 30 further comprising a bolt extending from the periphery through the tongue extension of the second sprocket section and into the recessed portion of the first sprocket section to fasten the first and second sprocket sections together.

32. A split sprocket comprising:
a first sprocket section and a second sprocket section joined to form:
at least three bore walls defining a central bore having an axis defining an axial direction; and
a periphery radially outward of and encircling the central bore;
wherein the first sprocket section forms a first complete one of the bore walls and wherein the second sprocket section forms a second complete one of the bore walls adjacent to the first complete one of the bore walls;
first and second slide tracks formed by mating track elements on the first and second sprocket sections, wherein the first sprocket section is joined to the second sprocket section by sliding the first and second sprocket sections together along the first and second slide tracks in a slide direction parallel to the second complete one of the walls and perpendicular to the axial direction.

33. A split sprocket as in claim 32 wherein at least one of the slide tracks is aligned with one of the bore walls.

34. A split sprocket as in claim 32 wherein the mating track elements of the first slide track include a first beam on the first sprocket section and a first slot on the second sprocket section receiving the first beam and the mating elements of the second slide track include a second beam on one of the first and second sprocket sections and a second slot on the other of the first and second sprocket sections receiving the second beam.

35. A split sprocket as in claim 34 wherein the first and second slots are T-shaped and the first and second beams are T beams.

36. A split sprocket as in claim 34 wherein the first and second slots are V-shaped and the first and second beams are V-shaped beams.

37. A split sprocket as in claim 34 wherein the first and second slots are jigsaw-puzzle-shaped and the first and second beams are jigsaw-puzzle-shaped beams.

38. A split sprocket as in claim 32 wherein the first and second sprocket sections are joined to form the central bore as a square having four bore walls.

39. A split sprocket as in claim 32 wherein the first sprocket section forms at least two complete adjacent bore walls and wherein the second sprocket section forms at least one complete bore wall.

40. A split sprocket as in claim 32 further comprising a threaded fastener extending from the periphery and through the second sprocket section into the first sprocket section to secure the first and second sprocket sections from sliding apart along the slide tracks.

* * * * *